MAGNETIC AMPLIFIER COMMUTATING AND ENCODING CIRCUIT

Filed Dec. 31, 1958 3 Sheets-Sheet 1

INVENTOR
WILLIAM H. LUCKE
BY Richard C. Reed
ATTORNEY

April 9, 1963 W. H. LUCKE 3,085,233

MAGNETIC AMPLIFIER COMMUTATING AND ENCODING CIRCUIT

Filed Dec. 31, 1958 3 Sheets-Sheet 2

INVENTOR
WILLIAM H. LUCKE

BY Richard C. Reed

ATTORNEY

April 9, 1963 W. H. LUCKE 3,085,233

MAGNETIC AMPLIFIER COMMUTATING AND ENCODING CIRCUIT

Filed Dec. 31, 1958 3 Sheets-Sheet 3

INVENTOR
WILLIAM H. LUCKE

BY Richard Reed

ATTORNEY 3,085,233
Patented Apr. 9, 1963

3,085,233

MAGNETIC AMPLIFIER COMMUTATING AND ENCODING CIRCUIT

William H. Lucke, Moores Lane, R. R. 3, Box 170, Clinton, Md.

Filed Dec. 31, 1958, Ser. No. 784,407
7 Claims. (Cl. 340—174)
(Granted under Title 35, U.S. Code (1952), sec. 266)

The invention described herein may be manufactured and used by or for the Government of the United States of America for governmental purposes without the payment of any royalties thereon or therefor.

This invention relates generally to magnetic amplifiers and, more particularly, to magnetic amplifier commutating and encoding circuits.

In the development of rockets, missiles and satellites, it has become apparent that compactness and lightness of weight, high reliability and long life in the face of stringent environmental conditions are necessary for electronic equipment included therein. In electronic equipment which requires a commutator, the mechanical commutators of the prior art have not provided the high degree of reliability, the long life, nor the compactness and lightness of weight required for proper operation when such apparatus is subjected to high gravitational ("*g*") forces. Also, prior apparatus suffered from the disadvantage of encoding of variations of the signal sources as pulses of variable amplitude and from the lack of sufficient power gain.

In this invention, the mechanical commutator has been replaced by an electronic commutator which is made entirely of solid state devices, such as rectangular hysteresis loop cores, transistors and solid state diodes. The circuit can be potted and made to be very rugged to withstand high "*g*" forces. Further, the amplitude variations of the signal sources are encoded as rectangular pulses of variable width and constant height at a relatively low frequency, an improvement which is highly advantageous in low signal-to-noise applications. Signal sources are also encoded in frequency variations at a relatively high frequency. Considerable power gain is provided by this circuit. In addition to these sought after improvements, the circuit of this invention is compact, weighs less than prior circuits of this general type and is highly reliable for a very long operational life.

It is, therefore, an object of this invention to provide a commutating and encoding circuit which is compact and is relatively light weight.

Another object is to provide a circuit which operates reliably for a long period of time.

Still another object is to provide a commutating circuit made entirely of solid state devices.

It is an object of this invention to provide a circuit which can be potted and made to be very rugged.

A further object of this invention is to provide a circuit in which the input signal variations are encoded as flux alignment levels in a magnetic core, called memory devices, and are read-out as rectangular pulses of variable width and constant height at a relatively low frequency.

A still further object of this invention is to provide a circuit in which the input signal variations are encoded as frequency changes of relatively high frequency.

Another object is to provide a commutating and encoding circuit in which a considerable gain in power is accomplished.

The exact nature of this invention as well as other objects and advantages thereof will be readily apparent from consideration of the following description relating to the annexed drawings in which.

Figures 1, 2:
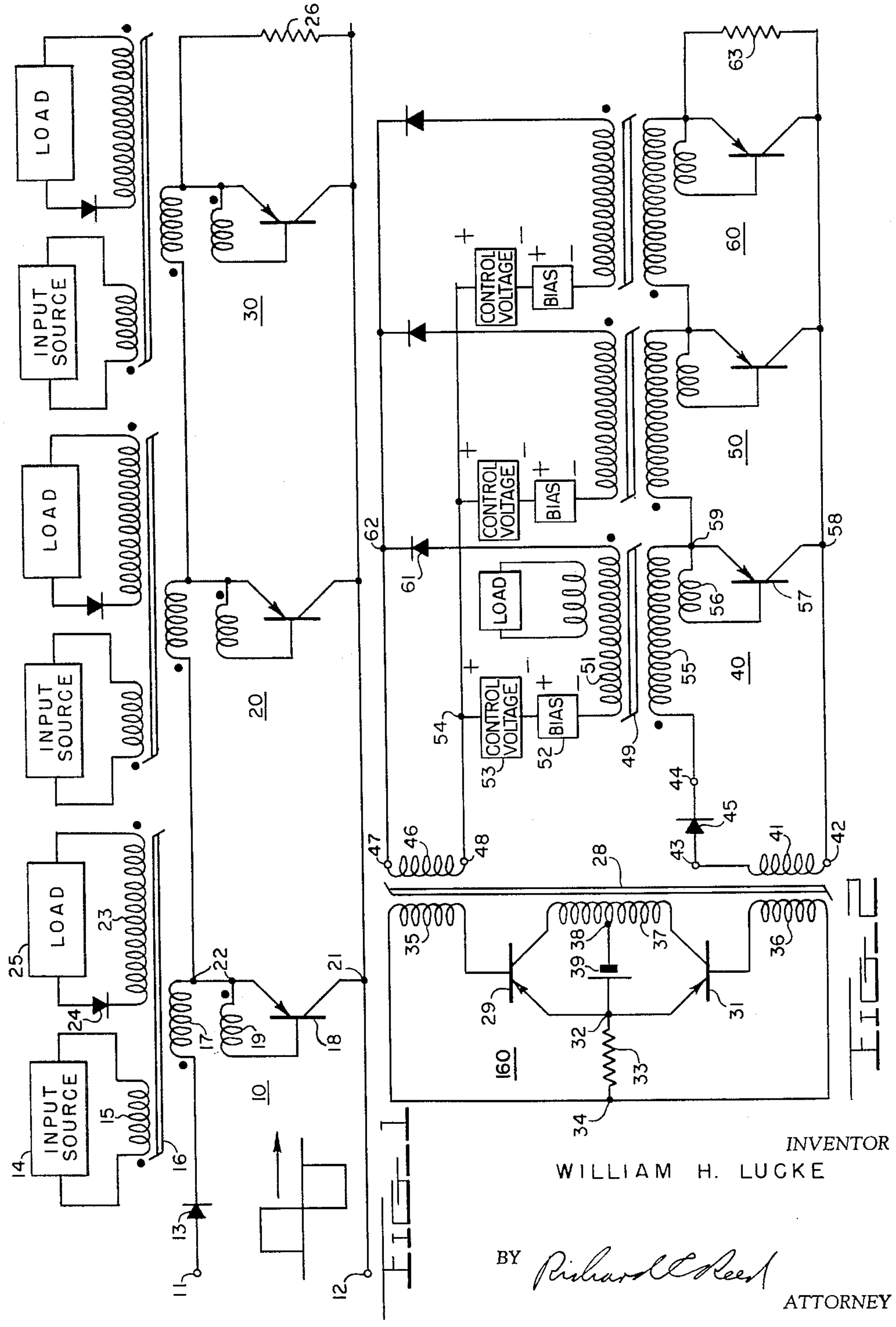
FIG. 1 is a schematic diagram of a simplified embodiment of this invention which provides commutating and pulse-width encoding.
FIG. 2 is a schematic diagram of a simplified embodiment of a three stage circuit of this invention in which the cores are independently encoded.

Briefly, the circuit of this invention is a commutating and encoding circuit wherein commutation is provided by the sequential operation which results from saturation of a plurality of magnetic cores in turn. A plurality of encoding stages include a first and second plurality of variable resistance or variable potential signal sources, or transducers. The first plurality of transducers is used to control the pulse-width for each stage by controlling the flux alignment level of a rectangular hysteresis loop magnetic core during one-half cycle of application of a relatively low frequency square wave driving signal. This level is then "readout" during the resetting which occurs during the other half-cycle of the driving signal as a pulse-width representation of the value of each of first plurality of transducers.

The second plurality of transducers controls the frequency of a relatively high frequency multivibrator. For full wave operation, a second bank of stages is added. The circuit of this invention can sequentially encode the value of the two transducers for each stage, the pulse-width and frequency representation of the two transducers in each stage appear simultaneously in the output.

The circuit of this invention incorporates the following principles. The commutating is accomplished by utilizing the property of magnetic amplifiers that, during the driving of a rectangular hysteresis loop magnetic core toward saturation by a constant voltage source which provides a voltage drop across a driving winding on the core, the driving winding has a very high impedance. The property of a transistor to operate as a switching device is also made use of in this invention. A properly polarized pulse applied to the base of a transistor controls the current flow through the emitter-collector current path in the transistor. When the potential of the properly polarized pulse below the switching threshold of the transistor is applied to the base thereof, the collector-emitter path has a very high impedance value. A potential above the switching threshold, which is applied to the base, switches the transistor "on" and the collector-emitter impedance value drops to substantially zero. Upon saturation of the core, the impedance in the driving winding drops to substantially zero and the voltage drop thereacross disappears. The unexpended driving voltage from the voltage source is then available at any point on the driving winding, including the end which had the lowest potential during the driving operation. To this point is connected one end of the driving winding of the next succeeding stage. With proper switching circuits to assure control, each of the stages is sequentially activated so that the cores will be driven to saturation in turn. An impedance element is provided to absorb the remainder of the driving voltage that is available after all of the cores have been saturated and to prevent free oscillation of the last stage otherwise caused by a triggering pulse induced by the fall from saturation to remanence of the flux level in the last core.

The pulse-width encoding is accomplished by utilizing the property of rectangular hysteresis loop magnetic cores that the saturation of flux alignment is a function of both quantity and time of application of an induction thereon. Each core has its characteristic volt-second integral capacity. The input signal to be encoded is applied across a winding. This winding is on a magnetic core initially at remanence, and is called a set winding since the value of the input signal is set into a core thereby. The flux alignment is changed from remanence to a value which is dependent upon the magnitude and the duration of the applied input signal. The input signal is represented by the level of flux alignment set in the core when the input signal is removed, the flux alignment will remain at that level, a memory level, until another outside force is applied thereto. When the constant voltage power source is applied across a driving winding on the core, the time required for the core to be reset to its original saturation becomes a pulse-width representation of the level of flux alignment which is representative of the input signal value and this is the desired pulse-width encoding.

The high frequency encoding is accomplished by the utilization of the property of a selected multivibrator that its frequency of operation is controllable by the variation of the potential of the power source applied thereto. When a circuit which includes a signal source, or transducer, in series with a winding on a magnetic core is connected so as to become the power source of the selected multivibrator, the signal induced in the winding and applied to the multivibrator is varied by the variation of the voltage or resistance of the transducer to control the frequency of operation of the multivibrator. This, then, is the desired frequency encoding.

Simultaneous output of a pulse-width representation of the value of one transducer and a frequency representation of the value of a second transducer is provided in the following manner. When a driving voltage is applied across a driving winding on a magnetic core to drive the flux alignment therein to saturation from a level which was set by the pulse width encoding circuit in the previous half-cycle of the input driving signal, the winding on the magnetic core which is included in the high frequency encoding circuit discussed in the above paragraph has induced thereacross a voltage drop which exists only during such driving time, provided that the pulse-width and frequency encoding are thereby simultaneous. It is obvious that the high frequency encoding circuit is stabilized so that there is no output therefrom during the set half-cycle of the input driving signal.

The output of one bank of stages can, therefore, be a pulse-width and frequency representation of the values of two separate transducers for each stage during alternate half-cycles, each stage being sequentially operated. To obtain full wave operation it is only necessary to provide a second bank of stages and proper stability of current flow therethrough so that each stage thereof will be sequentially operated during the half-cycles of the driving signal not used by the first bank. The stages of the two banks are polarized so that one bank of stages will be setting while the other bank is resetting. When the outputs of the two banks are combined an output occurs during each half-cycle of the input driving signal to give the desired full wave operation.

Referring now to the drawings, wherein like reference characters designate like or corresponding parts throughout the figures, there is shown in FIG. 1 an embodiment for sequentially encoding the values of three input sources, shown as input source 14 in stage 10. Across terminals 11 and 12 is applied a square wave voltage signal, such as applied to terminals 42 and 43 by multivibrator 160 in FIG. 2. Here the signal is shown by an idealized symbol, which is the driving signal for the several stages 10, 20 and 30. A unidirectional element 13 in series with input terminal 11 is provided to select a portion of the input driving signal. Each of the stages includes a rectangular hysteresis loop magnetic core 16 with three distinct circuits coupled thereto; namely, a set circuit which includes input source 14, a reset circuit with a driving signal applied thereto, and a load, i.e., readout or output circuit.

The dots are shown to indicate winding polarity. During the positively directed saturation of a core, the polarity of the voltage induced at the dotted ends of the windings is positive.

The driving circuit includes a driving winding 17 at the dotted end of which the rectified input square wave signal is applied. At the other end of driving winding 17 is a junction 22 to which are connected both the emitter of a p-n-p transistor 18 and the control winding 19 on core 16 which is the base voltage control winding for transistor 18. The collector of transistor 18 is connected through a junction 21 to input terminal 12, to complete the driving circuit path. The load circuit includes a load winding 23 on core 16, a unidirectional element 24 and a load 25, all three of which are connected in series, to comprise the complete load circuit. The unidirectional element 24 is polarized so as to render the load circuit effective only during the driving of core 16 toward positive saturation. The set circuit includes set winding 15 on core 16 and input source 14 connected thereacross, to complete the set circuit.

The several stages 10, 20, 30, and any others that might be desired, are connected together by the series connection of all of the several driving windings 17 in each stage, as at junction 22 in stage 10, and by providing a common return circuit path for the collectors of the several transistors 18 to input terminal 12. An impedance means shown as resistor 26 is provided across the end of the driving winding of the last stage of the bank of stages and the common return to absorb the remainder of the input signal which was not dissipated in the sequential saturation of the several cores 16 and to prevent free oscillation. The stages are identical in structure. It is possible, however, that the circuit values of each stage can be different if required in specific applications. For example, the number of turns for the set winding in the first stage can be double the number of turns for the set winding in the other stages in order to compensate for a transducer which has an output voltage level or resistance range that requires such accommodation.

In the operation of the circuit of FIG. 1, it is first assumed that the flux alignment in the cores in all the stages is at the positive stage of remanence which follows positive saturation. This means that the positive half of the input driving signal has just been applied and that the negative half thereof is beginning to be applied. With the disappearance of the positive potential at the dotted end of driving winding 17 with respect to the end thereof and likewise, all other windings on core 16, unidirectional element 13 prevents the negative half of the driving signal from being applied across driving windings 17. Resistor 26 would otherwise provide an unwanted current path.

The input source 14 is so proportioned that, upon the completion of the positive half-cycle of the driving signal and the corresponding disappearance of a positive potential at the dotted end of reset winding 17, the signal provided by the input source 14 will induce through input winding 15 a flux alignment change in core 16 to a level which is representative of the value of the input source 14. Core 16 will retain the flux alignment level until another driving signal is applied thereto. The set operation is simultaneous in all of the cores. Unidirectional element 24 prevents any current flow through the load circuit during the set operation.

Upon the completion of the negative half-cycle of the driving signal across input terminals 11 and 12, and upon the application of the positive half-cycle of the driving signal to winding 17 in stage 10, there is a short transient burst of current and a small reversible change of flux in all cores and the emitter-to-collector resistance of all transistors is momentarily lowered. However, the lowering of this resistance in the transistor 18 of the first stage means that less current and voltage is available for the succeeding stages. The condition is quickly established in which the first transistor is turned on, which means that only a few tenths of a volt of potential is available for causing flux change in the cores of the succeeding stages. This voltage is too small to cause magnetizing current to flow, so the last two stages are completely inactive. During reset, the load winding 23 has induced thereacross a voltage the duration of which is representative of the value of the input source.

Upon saturation of core 16 in stage 10 the inductance across driving winding 17 in stage 10 disappears, the inductance across transistor control winding 19 also disappears and, as a result, the full driving signal is applied across the driving winding of stage 20. As in stage 10, there is induced a potential on the base of the control transistor to turn the transistor on and provide an emitter-to-collector current path in stage 20 as in stage 10 previously. The reset of the several stages is, therefore, accomplished in sequence. Upon the application of the positive driving signal to the driving winding of the last stage and the ensuing flux change in the core, the transistor switch is closed. However, here as well as in the preceeding stages the base drive must be great enough to hold the transistor closed for magnetizing plus transformed load current as well. The transformed voltage of the driving signal is applied to the load for the required time for saturation to occur and is then removed. After saturation, the driving signal is applied to damping resistor 26 for the duration of the reset half-cycle. The presence of resistor 26 is necessary to prevent high-frequency oscillation after saturation of the core of the last stage. This oscillation is caused by the flux in the core dropping from its saturation to its remanence value. This sudden flux change in combination with the capacitance of the windings causes ringing which is amplified by the transistor to the point at which sustained oscillation occurs. By fixing resistor 26 in conjunction with the driving signal to give a current about equal to that flowing before saturation, the difficulty is eliminated.

In a one stage circuit, resistor 26 can be used as the load.

It is seen that the cores in all of the stages are set during the negative half-cycles of the driving voltage, and the cores are reset while the set information appears in the load circuit as a pulse of variable duration during the positive half-cycles of the driving winding. It is obvious that the polarities of the several sensitive elements can be reversed so that set would be during the positive half-cycles and reset would be during negative half-cycles.

The circuit shown in FIG. 2 differs structurally from the circuit of FIG. 1 principally by the provision of a multivibrator 160 as the driving, or reset, voltage source and the encoding, or set, voltage source as well. The output circuit has been excluded for simplicity.

Multivibrator 160 is an extremely simple circuit made up of a rectangular hysteresis loop magnetic core 28 with driving winding 37, which is center tapped at 38, and control windings 35 and 36 thereon. Two p-n-p transistors 29 and 31 are connected so that their emitters are joined at junction 32, and their collectors are connected to opposed ends of driving winding 37. One end of each of control windings 35 and 36 is connected to a junction 34. The other end of control winding 35 is connected to the base of transistor 29 and the other end of control winding 36 is connected to the base of transistor 31. A power source 39 is connected between center tap 38 and junction 32 and a current limiting resistor 33 is connected between junctions 32 and 34. The polarity sensitive elements of the multivibrator are so polarized that when core 28 is being driven to saturation in one direction, one of the transistors is maintained in a saturated state and the other is maintained in a non-conductive state. Upon saturation of core 28, the kick-back caused by the fall from saturation to remanence in core 28 provides sufficient and properly polarized triggering to reverse the state of conductivity experienced by the two transistors so that the core will then be driven toward saturation in the opposite direction. The transistors are maintained in their reversed states until the completion of the saturation of the core in this opposite direction. Then the fall from saturation to remanence in the core triggers a second reversal to restore the original driving condition, all of which is seen to be the familiar multivibrator action. It is to be noted that upon the saturation of the magnetic core 28 in either direction, no further flux change can be produced therein and this causes a disappearance of any control voltage on the bases of the transistors causing the transistors to be in their off condition. This results in the disappearance of current through the driving winding. Without any driving current, the core is free to drop from its saturated state to its remanent state, and it is this drop that induces a voltage in one of the control windings which is applied to the base of the transistor, which was in its off condition during the previous half-cycle of operation, to turn it on. This drop also induces an oppositely polarized voltage in the other control winding which is applied to the base of the other transistor to further bias such other transistor in its off condition. The frequency of the multivibrator 160 can be varied by a variation of the potential of the power source 39 therefor. The resistance 33 is provided to limit the voltage applied to the base of the transistors.

The sequential encoding stages 40, 50 and 60 of the circuit of FIG. 2 are connected to the reset driving signal source by terminals 42 and 44. The stages are connected to the encoding, or set, voltage source at terminals 47 and 48. Winding 41 on core 28 of the multivibrator 160 is connected between terminals 42 and 43. Connected between terminals 43 and 44 is a unidirectional element 45 which selects a portion of the input signal to be delivered to the several stages. Winding 46 on core 28 of the multivibrator 160 is connected between terminals 47 and 48 to provide the set voltage source. The stages 40, 50 and 60 are identical in structure, but are adaptable to different parametric values as are all of the embodiments of this invention.

Each of the stages of the circuit shown in FIG. 2 includes a rectangular hysteresis loop magnetic core 49 with an encoding, or set, circuit and a driving, or reset, circuit coupled thereto. The driving, or reset, circuit of FIG. 2 is identical with the driving circuit of FIG. 1. The driving winding 55 is equivalent to driving winding 17, transistor 57 is equivalent to transistor 18 and control winding 56 is equivalent to control winding 19. The encoding, or set, circuit includes set winding 51 connected at its dotted end through a rectifier 61 to the terminal 47 for winding 46 on core 28 of the multivibrator 160. Connected to the other end of set winding 51 is the negative end of a bias source 52. Connected to the positive end of the bias 52 is the negative end of a control source 53, the value of which is to be encoded. The positive end of control source 53 is connected through a junction 54 to terminal 48 of winding 46 on core 28.

The driving windings 55 of the several stages 40, 50 and 60 are serially connected with an impedance element 63 connected across the not dotted end of the driving winding of the last stage and the common return to terminal 42. The control voltages are all connected through junction 54 to terminal 48 and the rectifiers in the set circuit are all connected through junction 62 to terminal 47.

The sequential operation of the several stages shown in the circuit of FIG. 2 is the same as the sequential operation of the several stages shown in the circuit of FIG. 1. The set operation, however, is different. On the reset half-cycle, terminals 47 and 43 are positive with respect to 48 and 42. As core 49 resets, a voltage is induced in the set winding 51 of such a polarity as to unblock rectifier 61. However, the driving signal is reset by design to hold the negative side of rectifier 61 more positive than the voltage generated by the set winding 51, so that the set winding 51 is effectively isolated and can neither load the reset circuit nor interact with any of the other setting circuits. At the same time, the rectifiers in stages 50 and 60 keep the driving signal from affecting the cores of stages 50 and 60, since in these two stages there is no voltage induced in the set windings. If the signal 53 and bias 52 sources are voltages, their polarity is in a direction opposite to the set winding 51 voltages; i.e., they help the driving signal block the rectifiers. Since the voltage induced in any set winding 51 is zero under either (1) the condition of no current in the reset winding 55 or (2) the condition of current in the reset winding 55 but with the core 49 saturated, it is apparent that regardless of which cores are saturated, which is firing or which are yet to be fired, the setting circuits are isolated from one another and from the driving signal, except for rectifier leakage. With good semiconducting diodes, the leakage currents can be held to values well below magnetizing current, so that their effect is negligible.

When the reset half-cycle is completed, the voltages across terminals 47 and 48 and terminals 43 and 42 are reversed. The driving signal is blocked by the rectifier 45. The set signal, however, is in such a direction as to unblock rectifiers 61 in all stages. This unblocking puts the three setting circuits in parallel across terminals 47 and 48. Setting currents flow simultaneously from terminal 48 through the control sources 53, the bias sources 52, the set windings 51 and the rectifier 61 to terminal 47.

The fact that the cores are set in parallel means that simultaneous voltages are induced in the reset windings 55. Unfortunately, these voltages are in such a direction as to add, and if care is not exercised in design, their sum may be of sufficient magnitude to unblock rectifier 45 and throw a load on the setting circuit. Suppose that the turns ratio of the reset-to-set windings is one, that the driving signal equals the setting signal, and that all control and bias sources are zero. Then the voltage at the point 44 would be the sum of the individual voltages induced in the reset windings 55, or −3 times the driving signal, while the voltage at terminal 43 would be the driving signal voltage; clearly the rectifier would unblock.

In fact, there are three conditions which must simultaneously be satisfied for proper operation of the circuit. These three conditions are met in the circuit of this invention. (1) The sum of the voltages induced in the reset windings during set cannot be greater than the driving voltage. (2) The total volt-seconds set of the cores which takes place during the entire set half-cycle must be less than or equal to the total volt-second capability of the driving signal during the reset half-cycle. (3) The voltage induced in the set windings during the reset half-cycle must not be large enough to unblock the set circuit rectifiers.

Figure 3:
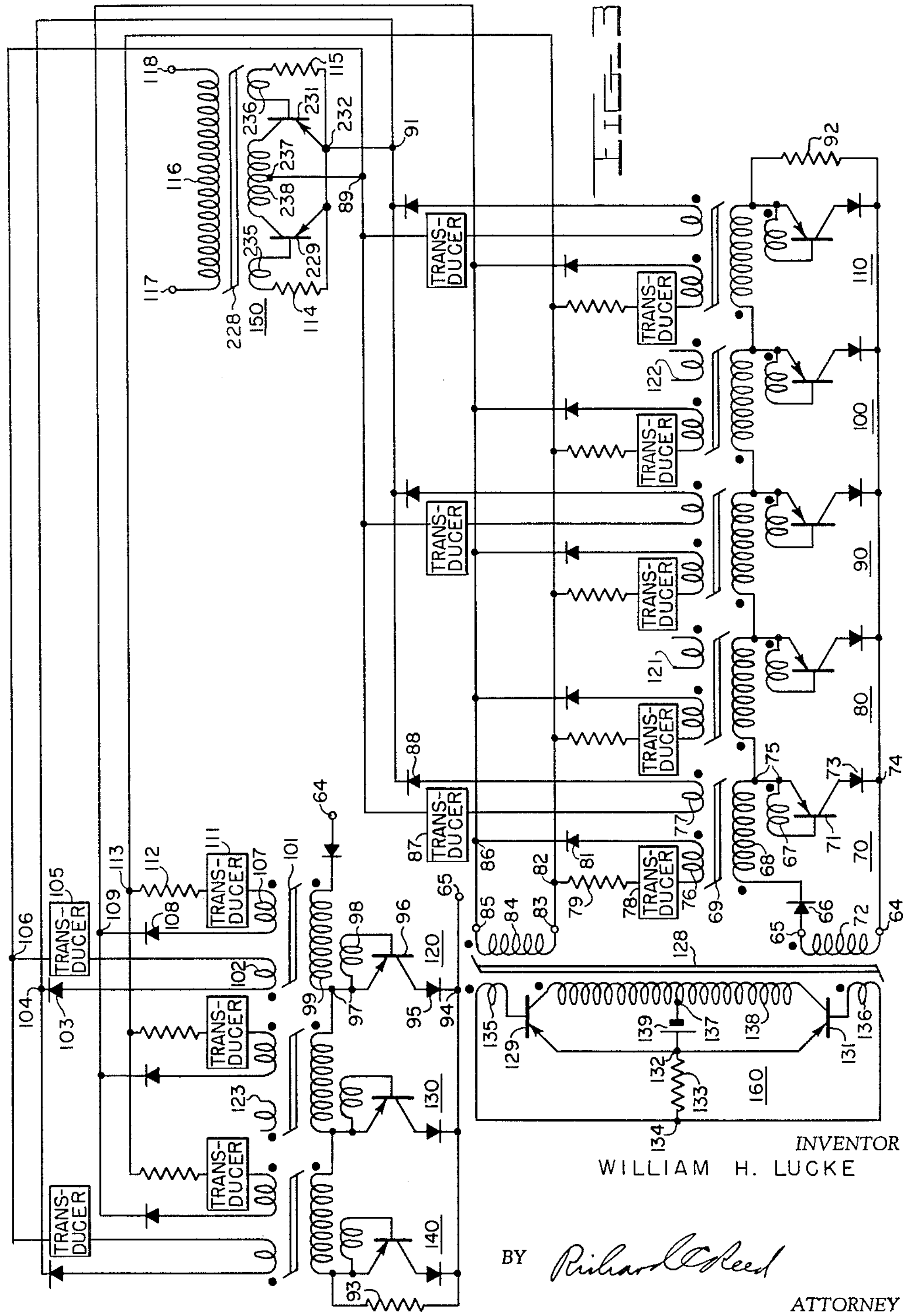
FIG. 3 is a schematic diagram of a commutating and full wave encoding circuit embodiment of the principles of this invention.

In the circuit of FIG. 3, the value of one transducer is encoded as a pulse width and the value of a second transducer is encoded as a frequency, the two values are read-out simultaneously. Also, full wave operation is provided in the circuit of FIG. 3.

The multivibrator 160 is identical with the multivibrator 160 in FIG. 2. The same numbers are given to the same parts thereof with the exception that in FIG. 3, the numbers of the components of multivibrator 160 have been increased by one hundred. The stages 70 through 140 include identical circuits and components. Each stage includes a rectangular hysteresis loop magnetic core 69, in the first bank and an equivalent core 101 in the second bank. A reset driving circuit is made up of driving winding 68 in the first bank and winding 99 in the second bank, control winding 67 or 98, transistor 71 or 96 and a rectifier 73 or 95. The rectifier 73 and 95 is connected between the collector of the transistor of that stage and the junction 74 or 94 which puts the rectifier in the return path to the driving signal source to prevent stage interaction during encoding, or set. Such interaction could otherwise occur, for example, if the core of stage 100 is not to be set at all, but cores of stages 90 and 110 are to be set the full amount. The positive voltage appearing at the end of the core of stage 110 can feed through the resistance 92 to the common return path to terminal 64. In the absence of the rectifier 73, this positive voltage would be in the forward direction of the diode formed by the collector and base of the transistor in stage 100 and the base control winding could partially set the core in stage 100. The positive voltage at the end of the core in stage 90 would aid this effect because of back leakage through the transistor in stage 90. Rectifier 95 provides the same function for the second bank of stages as does rectifier 73 provide for the first bank of stages.

Rectifier 66 is connected between terminal 65 and the dotted end of the first stage 70 of a first bank of stages 70 through 110. Rectifier 66 is polarized so as to apply only the positive half-cycles of the reset driving signal generated across winding 72 on core 128 of multivibrator 160 to the dotted end of the reset winding 68 on core 69.

In the encoding circuit, the bias 52 of FIG. 2 is replaced by impedance 79 and 112 in FIG. 3. The control voltage 53 of FIG. 2 appears as transducer 78 or 111 in FIG. 3.

In the circuit of FIG. 3, a second multivibrator 150, which is designed to operate at a frequency that is high relative to the frequency of multivibrator 160, is included. Multivibrator 150 includes structure which is identical with the structure of multivibrator 160, with the exception of the impedances 114 and 115 which are equivalent to the single impedance 133 of multivibrator 160. These resistors to limit the current which is applied to the bases of the transistors 229 and 231. Power source 139 of multivibrator 160 is replaced by the output of the load circuit of the respective banks. The load circuit includes transducer 87, load winding 77 and rectifier 88 connected in series with junctions 89 and 91. Junction 89 is connected to center tap 237 of driving winding 238 of multivibrator 150 and junction 91 is connected to junction 232 to which are also connected the emitters of the p-n-p transistors 229 and 231 of multivibrator 150. The output across winding 116 on core 228 of multivibrator 150 which is available at terminals 117 and 118 is used to drive the modulator of a telemetering system. The modulator, transmitter or antenna for the telemetering system are not shown in the drawings since this invention is directed to the encoding and commutating structure illustrated.

It is to be noted that the second bank of stages which include stages 120 through 140 are connected to the driving signal source in such a manner as to provide reversed operation. That is, since the driving signal produced across winding 72 is positive at terminal 65 during one half-cycle, and positive at terminal 64 during the other half-cycle, the driving signal for the first bank is tapped at terminal 64. With this connection, the cores of one bank of stages are being set while the cores of the other bank of stages are being reset.

In the operation of the circuit of FIG. 3, the low frequency, or supply, multivibrator 160 operates at a frequency of, for example, 75 cycles per second, delivering a driving signal of 2.5 volts and a setting signal of 12 volts. The high frequency multivibrator 150 operates in the range of 2 to 5 kilocycles and, within limits, the fundamental frequency thereof depends linearly on the voltage applied. The power sources for the multivibrator 150 are the load windings in stages 70, 90, 110, 120 and 140 feeding through the transducers 87 and 111 of the stages. The rectifiers 88 and 103 are provided to isolate the inactive stages from the active ones and to block voltages induced in the load windings during set. Multivibrator 150 is operative only during the reset operation of each stage and during reset of only the stages which include a load circuit. It is often desirable that the frequency bursts of the high-frequency multivibrator 150 be separated by periods of inactivity and this is provided by the omission of a load circuit in stages 80, 100 and 130. However, such load circuits can be provided to give a continuous high-frequency output.

Figure 4:
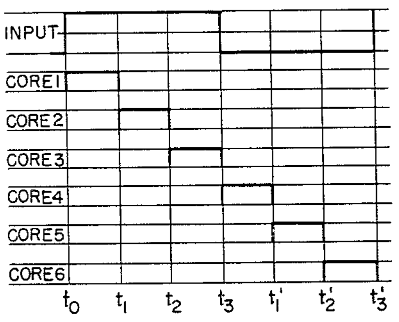
FIG. 4 is an idealized diagram of the output waveforms of a circuit such as shown in FIG. 3 where only three stages in each of the two banks of stages are included, and where all of the cores are encoded to the level of saturation.
Figure 5:
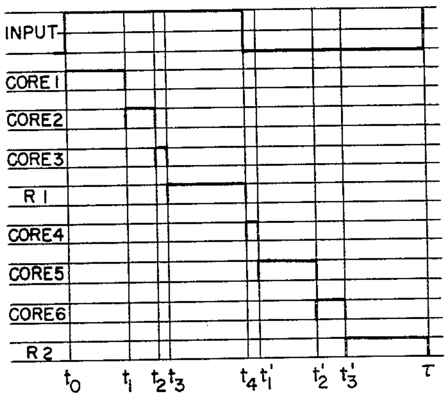
FIG. 5 is an idealized diagram of the output of the same circuit as the output illustrated in FIG. 4 with the exception that the cores are encoded to differing percentage levels of the saturation level.

The wave forms shown in FIGS. 4 and 5 represent the pulse-width encoding of this invention. For FIG. 4, for a two bank (full wave) circuit including three stages in each bank, each of the cores has identical parametric values and has been set its full amount. During the resetting half-cycle, the outputs are as illustrated, with the output of the first core closely followed by the output of the second core, and the second closely followed by the output of the third core, all during the positive half-cycle of the driving signal, or input as indicated in the figures. The outputs of the last three cores occur during the negative half-cycle of the input. Since the transducer value, or input source value, of all of the cores is the same, the pulse-width of all of the output signals is the same. In FIG. 5, the same circuit as illustrated in FIG. 4 now has experienced a variation of transducer value. The first core has been completely set, the second core has been set one-half of full set, core 3 has been set one-sixth of full set, core 4 one-sixth of full set, core 5 full set, and core 6 one-half set. It is seen that since the cores were not all fully set, there is a residue of the driving signal which is applied across resistor 1, which is resistor 26 in FIG. 1, resistor 63 in FIG. 2 and resistor 92 in FIG. 3, and resistor 2 which is resistor 93 in FIG. 3. It is seen that the variations of pulse-width as represented by the time segments $t_0-t$ of the driving signal duration are representative of the values of the transducers which control such pulse-width in each stage.

Figure 6:
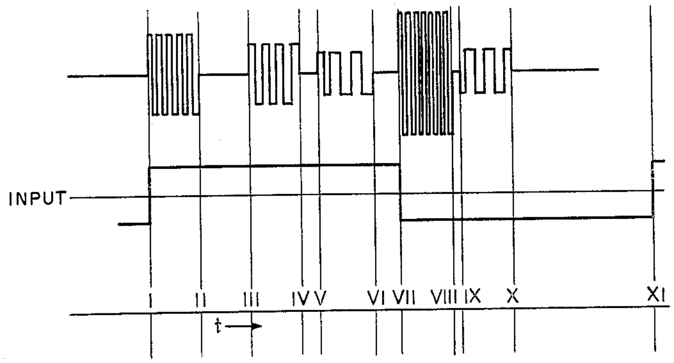
FIG. 6 is a typical output frame from a fourteen channel system as shown in FIG. 3.

In FIG. 6, the output of the full wave circuit of FIG. 3 is illustrated. During the first pulse-width, between I and II, a frequency burst is shown which represents the value of transducer 87 in stage 70. The pulse-width represents the value of transducer 78 of the same stage. The absence of a frequency burst during the second pulse-width, between II and III, reveals the absence of a load circuit for stage 80. The pulse-width represents the value of the transducer that is set into the core of stage 80. The pulse-width between VI and VII represents the amount of the driving signal that is applied across resistor 92. The pulse-width X to XI represents the amount of the driving signal that is applied across resistor 93. This pulse-width can be used as a reference point for the recognition of the end of a frame.

It is seen that the period of the driving signal, labeled "input" in FIG. 6, is a function of the power source which produces such driving signal and, therefore, becomes the fourteenth channel.

The frame rate is set by the fundamental frequency of the A.-C. supply. By present techniques, this rate can certainly be increased to a few kilocycles, provided the number of stages is not too large. A limitation here is the frequency capability of the A.-C. supply transistors, which in turn depends on the power they must handle.

Though the set circuits shown in FIGS. 2 and 3 draw the setting voltage from a common supply, separate setting voltage windings can be provided with each stage, thereby permitting either grounded or ungrounded input.

The sequential set circuit is seen to be basically an application of magnetic amplifier circuitry and as such displays the usual characteristics of such circuits. It handles direct voltages with facility, has a rather limited bandwidth, and the output occurs about one half-cycle later than the input. Considerable power gain is also possible, particularly when the internal impedance of the supply source is kept low. The only inherent power limitation is in the transistors.

In conclusion, it may be stated that the components of the present circuit are reliable; the circuit itself is simple and is capable of being reduced to a small package which can be potted and hence made mechanically very rugged.

The circuit of this invention further described in: Naval Research Laboratory Report 5082, a Solid-State Commutating and Pulse-Width Encoding Circuit, by W. H. Lucke. PB 131486 dated June 13, 1958, and in: Paper 58-1162 in the January 1959 issue of the Transactions of the American Institute of Electrical Engineers.

Obviously many modifications and variations of the present invention are possible in the light of the above teachings. It is therefore to be understood that within the scope of the appended claims the invention may be practiced otherwise than as specifically described.

What is claimed is:

1. In a commutating and encoding circuit, means for producing a balanced alternating current signal, unidirectional signal conducting means, and a plurality of operative stages; each of said stages including: memory means capable of having a plurality of stable states, encoding means for setting the state of said memory means, clearing means for resetting the state of said memory means and gating means responsive to the voltage drop across said clearing means to select the operativeness of said state; said means for producing a balanced alternating current signal, said unidirectional signal conducting means and said clearing means in each of said stages being serially connected, said encoding means and said clearing means being operative during opposed half cycles of said balanced alternating current signal.

2. In a commutating and encoding circuit, means for producing a balanced alternating current signal, a first unidirectional signal conducting means, and a plurality of operative stages; each of said stages including: memory means capable of having a plurality of stable states, encoding means for setting the state of said memory means, a second unidirectional signal conducting means, clearing means for resetting the state of said memory means, and gating means to control the operativeness of said stage; said means for producing a balanced alternating current signal, said first unidirectional signal conducting means and said clearing means in each of said stages being serially connected, said encoding means and said second unidirectional signal conducting means in each of said stages being serially connected across said means for producing a balanced alternating current signal, said first unidirectional signal conducting means being oppositely polarized from said second unidirectional signal conducting means.

3. In a commutating and encoding circuit, means for producing a balanced alternating current signal, a first unidirectional signal conducting means, a common return, damping means, and a plurality of operative stages; each of said stages including: memory means capable of having a plurality of stable states, encoding means for setting the state of said memory means, a second unidirectional signal conducting means, clearing means for resetting the state of said memory means, and gating means to control the operativeness of said stage; said means for producing a balanced alternating current signal, said first unidirectional signal conducting means and said clearing means in each of said stages being serially connected, said gating means connected to provide a controlled path through said clearing means to said common return, said damping means serially connected between said clearing means in the last of said plurality of stages and the common return, said encoding means and said second unidirectional signal conducting means in each of said stages being serially connected across said means for producing a balanced alternating current signal, said first unidirectional signal conducting means being oppositely polarized from said second unidirectional signal conducting means.

4. In a commutating and encoding circuit, means for producing a balanced alternating current signal, a plurality of unidirectional signal conducting means, a common return, and a plurality of operative stages; each of said stages including; a high remanent magnetic core with first, second and third windings thereon, each of said windings having first and second ends and a gating means having first, second and third terminals thereon, said second end of said first winding connected to said first end of said second winding and to said first terminal of said gating means, the second end of said second winding connected to said second terminal of said gating means, said third terminal of said gating means connected to said common return, and a sampling means, said sampling means and one of said unidirectional signal conducting means serially connected to said means for producing a balanced alternating current signal; said means for producing a balanced alternating current signal, another of said unidirectional signal conducting means and said first winding in each of said stages being serially connected.

5. In a commutating and encoding circuit, means for producing a balanced alternating current signal, a first unidirectional signal conducting means, a common return, a damping means and a plurality of operative stages; each of said stages including: a high remanent magnetic core with first, second, third and fourth windings thereon, each of said windings having first and second ends, a p-n-p type transistor having a base, collector and an emitter, an input source, and output load and a second unidirectional signal conducting means, said second end of said first winding being connected to said first end of said second winding and to said emitter, the second end of said second winding being connected to said base, said collector being connected to said common return, said input source connected in series with said third winding, said output load and said second unidirectional signal conducting means being serially connected with said fourth winding; said means for producing a balanced alternating current signal, said first unidirectional signal conducting means, said first winding in each of said stages and said damping means being serially connected, said first and second unidirectional signal conducting means being oppositely polarized.

6. In a commutating and encoding circuit, means for producing a balanced alternating current signal, a first unidirectional signal conducting means, a common return, a damping means and a plurality of operative stages; each of said stages including: a high remanent magnetic core with first, second and third windings thereon, each of said windings having first and second ends, a p-n-p transistor with a base, emitter and a collector, a second unidirectional signal conducting means, a bias voltage source and a means to provide a control voltage, said second end of said first winding, said first end of said second winding and said emitter being connected at a junction, said second end of said second winding and said emitter being connected at a junction, said second end of said second winding being connected to said base, said collector being connected to said common return, said means for producing a balanced alternating current signal, said means to provide a control voltage, said bias voltage source and said second unidirectional signal conducting means being serially connected; said means for producing a balanced alternating current signal, said first unidirectional signal conducting means, said first winding in each of said stages and said damping means being serially connected, said first and second unidirectional signal conducting means being oppositely polarized.

7. In a commutating and encoding circuit, first and second free running multivibrators, said first multivibrator providing a balanced alternating current signal across first and second output windings thereon, the output of said second multivibrator being significant in both pulse width and in frequency a common return, a damping means, and a plurality of operative stages; each of said stages including: a high remanent magnetic core, first, second, third and fourth windings thereon, each of said windings having first and second ends, a p-n-p transistor with a base, emitter and a collector, a plurality of unidirectional signal conducting means, first and second transducing means and impedance means, said second end of said first winding, said first end of said second winding and said emitter connected at a junction, said second end of said second winding connected to said base, one of said unidirectional signal conducting means being serially connected between said collector and said common return, said impedance means, said first transducing means, said third winding and a second of said unidirectional signal conducting means being serially connected with one of said output windings of said first multivibrator, said second transducer means, a third one of said unidirectional signal conducting means and said fourth winding being serially connected to said second multivibrator to control the frequency thereof, said first transducer being effective to control the pulse width of the output of said second multivibrator; the second of said output windings of said first multivibrator, a fourth one of said unidirectional signal conducting means, said first winding in each of said stages, said damping means and said common return being serially connected, said unidirectional signal conducting means beig polarized such that anti-phase currents pass through said first, third and fourth windings on said magnetic core in each of said stages.

References Cited in the file of this patent

UNITED STATES PATENTS

| | | |
|---|---|---|
| 2,408,077 | Labin | Sept. 24, 1946 |
| 2,601,089 | Buckhart | June 17, 1952 |
| 2,816,278 | Whitely | Dec. 10, 1957 |